US012689575B2

(12) United States Patent
Donnelly

(10) Patent No.: US 12,689,575 B2
(45) Date of Patent: Jul. 21, 2026

(54) SYSTEM AND METHOD TO CAPTURE A NETWORK TRACE IN A CELLULAR COMMUNICATION NETWORK

(71) Applicant: Boost SubscriberCo L.L.C., Englewood, CO (US)

(72) Inventor: Sean Patrick Donnelly, Allen, TX (US)

(73) Assignee: Boost SubscriberCo L.L.C., Englewood, CO (US)

( * ) Notice: Subject to any disclaimer, the term of this patent is extended or adjusted under 35 U.S.C. 154(b) by 348 days.

(21) Appl. No.: 18/541,796

(22) Filed: Dec. 15, 2023

(65) Prior Publication Data

US 2025/0202797 A1     Jun. 19, 2025

(51) Int. Cl.
H04L 43/10          (2022.01)
H04L 43/045        (2022.01)

(52) U.S. Cl.
CPC ............ H04L 43/10 (2013.01); H04L 43/045 (2013.01)

(58) Field of Classification Search
CPC ....................................................... H04L 43/10
See application file for complete search history.

(56) References Cited

U.S. PATENT DOCUMENTS

| | | | | |
|---|---|---|---|---|
| 7,526,550 B2 * | 4/2009 | Frey | .................... | G06F 11/3476 |
| | | | | 709/224 |
| 10,880,191 B1 * | 12/2020 | Kant | .................. | G06F 11/3466 |
| 10,970,150 B1 * | 4/2021 | Hunter | ................ | G06F 11/0754 |
| 11,456,911 B1 * | 9/2022 | Krishnagi | ........... | G06F 11/3409 |
| 11,546,243 B1 * | 1/2023 | Menon | .................... | H04L 43/10 |
| 12,487,875 B1 * | 12/2025 | Côrte-Real | ......... | G06F 11/0769 |
| 2015/0142957 A1 * | 5/2015 | Forsberg | ............. | H04L 65/1016 |
| | | | | 709/224 |
| 2021/0191802 A1 * | 6/2021 | Hunter | ................ | G06F 11/0793 |
| 2022/0360505 A1 * | 11/2022 | Tiwari | .................. | H04L 41/507 |
| 2022/0382525 A1 * | 12/2022 | Kaitha | ..................... | G06N 3/04 |
| 2023/0198866 A1 * | 6/2023 | Gao | ..................... | H04L 41/0654 |
| | | | | 709/224 |
| 2023/0208708 A1 * | 6/2023 | Kumar | .................... | H04L 47/70 |
| | | | | 709/223 |
| 2023/0336400 A1 * | 10/2023 | Gao | ......................... | H04L 43/50 |
| 2024/0248833 A1 * | 7/2024 | Gupta | ................ | G06F 11/0709 |
| 2024/0338594 A1 * | 10/2024 | Liu | ......................... | G06N 20/00 |
| 2025/0384735 A1 * | 12/2025 | Chun | .................. | G07F 17/3241 |
| 2026/0017464 A1 * | 1/2026 | Ghoche | .................. | G06F 40/35 |

* cited by examiner

*Primary Examiner* — Guang W Li
(74) *Attorney, Agent, or Firm* — Kilpatrick Townsend & Stockton LLP

(57)          ABSTRACT

In response to receiving a request, a processor generates an incident ticket relating to an error associated with a communication between two devices in a cellular network. The processor receives search parameters relating to a network trace associated with the erroneous communication and generates and transmits an API call to a network tracing sub-system for a record of the network trace. The processor receives the record of the network trace from the network tracing sub-system and stores the record in a memory. The processor then receives a request to view the record of the network trace and, in response, retrieves the record from the memory and presents the record on a display device.

20 Claims, 2 Drawing Sheets

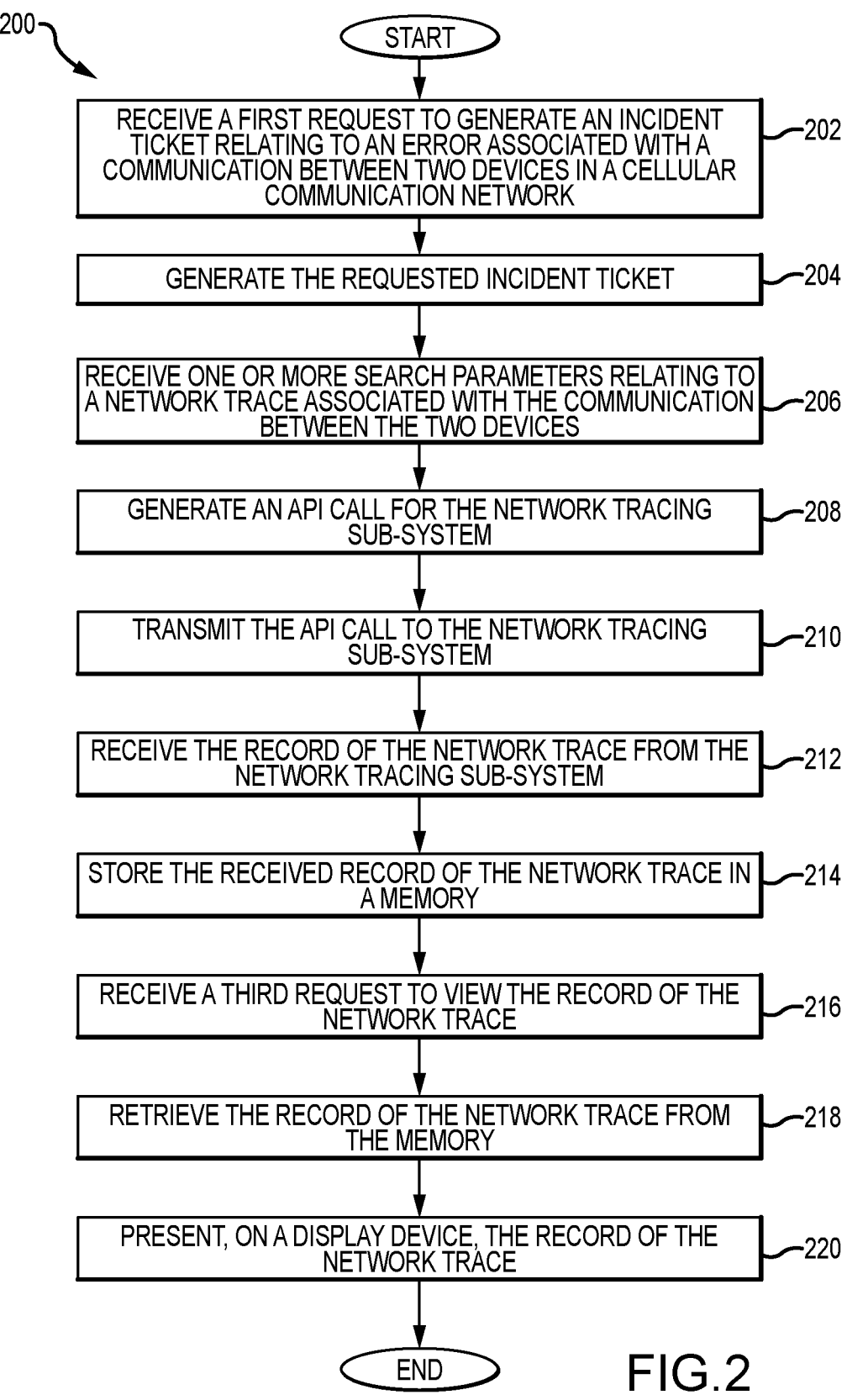

200

START

RECEIVE A FIRST REQUEST TO GENERATE AN INCIDENT TICKET RELATING TO AN ERROR ASSOCIATED WITH A COMMUNICATION BETWEEN TWO DEVICES IN A CELLULAR COMMUNICATION NETWORK —202

GENERATE THE REQUESTED INCIDENT TICKET —204

RECEIVE ONE OR MORE SEARCH PARAMETERS RELATING TO A NETWORK TRACE ASSOCIATED WITH THE COMMUNICATION BETWEEN THE TWO DEVICES —206

GENERATE AN API CALL FOR THE NETWORK TRACING SUB-SYSTEM —208

TRANSMIT THE API CALL TO THE NETWORK TRACING SUB-SYSTEM —210

RECEIVE THE RECORD OF THE NETWORK TRACE FROM THE NETWORK TRACING SUB-SYSTEM —212

STORE THE RECEIVED RECORD OF THE NETWORK TRACE IN A MEMORY —214

RECEIVE A THIRD REQUEST TO VIEW THE RECORD OF THE NETWORK TRACE —216

RETRIEVE THE RECORD OF THE NETWORK TRACE FROM THE MEMORY —218

PRESENT, ON A DISPLAY DEVICE, THE RECORD OF THE NETWORK TRACE —220

END

FIG.2

SYSTEM AND METHOD TO CAPTURE A NETWORK TRACE IN A CELLULAR COMMUNICATION NETWORK

TECHNICAL FIELD

The present disclosure relates generally to wireless communications, and more specifically to a system and method to capture a network trace in a cellular communication network.

BACKGROUND

Often errors/faults occur when two devices are communicating or attempting to communicate with each other in a cellular network. The errors/faults may include, but are not limited to, a call failure, undelivered text message, and failed data transmission between two devices. Generally, investigating an error associated with a communication between two devices in the cellular network includes running a network trace of the communication which includes tracing a route taken by data/signaling between the devices through various network elements of the cellular network and recording a plurality of quality and/or performance indicators associated with the monitored network elements. The results of the network trace are used to isolate a root cause of the error. Records of network traces are generally deleted after a pre-selected time period.

SUMMARY

The system and methods implemented by the system as disclosed in the present disclosure provide an intelligent technique to capture a network trace performed in a cellular network. The disclosed system and methods provide several practical applications and technical advantages. For example, the disclosed system and method provide the practical application of intelligently capturing records of network traces performed using a network tracing subsystem such that the records are available indefinitely allowing investigation of a respective error incident to be performed without any time constraint. As described in embodiments of the present disclosure, a network tracing sub-system is used to run a network trace to investigate an error associated with a communication between two UEs in a cellular network. A record of the network trace is stored at the network tracing sub-system for a limited time period after which the record is deleted. A ticketing sub-system is used to generate an incident ticket associated with the error for which the network trace is run. The incident ticket is used to track and manage the process of investigation and resolution of the error. The ticketing sub-system receives one or more search parameters associated with the network trace associated with the error, wherein the one or more search parameters include unique parameters or a combination of parameters that uniquely identify the record of the network trace stored in the network tracing sub-system. The ticketing sub-system generates and transmits an Application Programming Interface (API) call to the network tracing sub-system, wherein the API call includes a request for the record of the network trace and the one or more search parameters provided by the user. Upon receiving the API call from the ticketing sub-system, the network tracing sub-system may be configured to search for the record based on the one or more search parameters included in the API call. The network tracing sub-system may transmit a response message back to the ticketing sub-system including a copy of the record of the network trace. Upon receiving the response message, the ticketing sub-system stores the record of the network trace in memory and associates the record with the incident ticket. Once a record of a network trace is saved in the ticketing sub-system and associated with the respective incident ticket, the record is available and accessible indefinitely for review without any time constraint.

By importing the record of the network trace from the network tracing sub-system and storing indefinitely within the ticketing sub-system that is used to track the investigation and resolution of the error, the disclosed system and methods avoid having to re-run the network trace. This saves computing resources and network bandwidth that would otherwise be used to re-run the network trace. By saving computing resources and network bandwidth the disclosed system and method improve performance of computing nodes used to run the network traces and further improve network performance. Additionally, not having to re-run a network trace saves time and improves the speed of investigation and resolution of an error associated with the cellular network. Speedy resolution of errors in the cellular network improves network performance. Thus, the disclosed system and methods generally improve wireless communication technology.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a flowchart of an example method for capturing a network trace performed in a cellular network, in accordance with embodiments of the present disclosure.

DETAILED DESCRIPTION

System Overview

Figure 1:
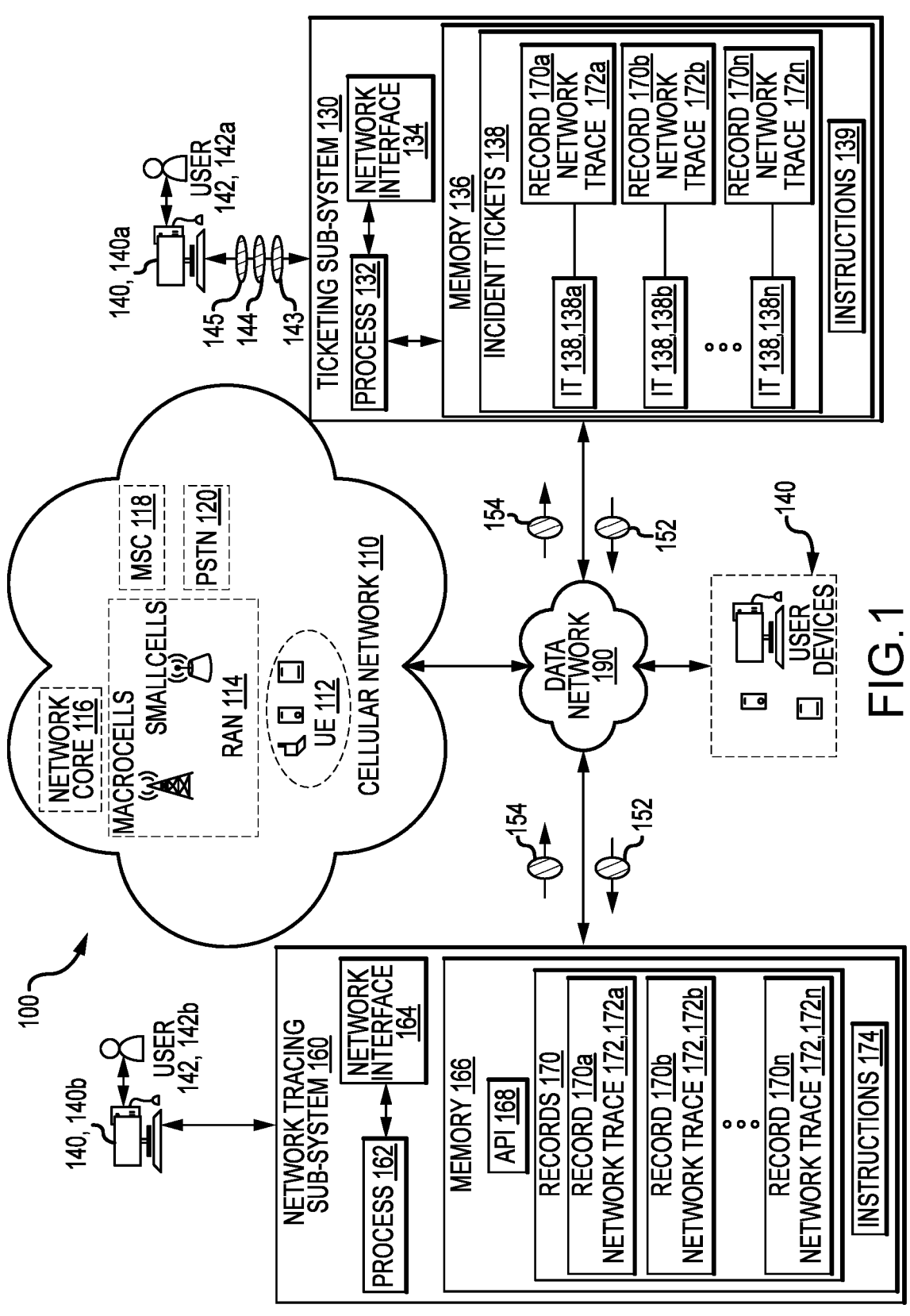
FIG. 1 illustrates a system in accordance with embodiments of the present disclosure.

FIG. 1 illustrates an example system 100, in accordance with embodiments of the present disclosure. As shown in FIG. 1, system 100 may include a cellular network 110, a ticketing sub-system 130, user devices 140, and a network tracing sub-system 160, each connected to a data network 190. The cellular network 110 may include a plurality of network elements including, but not limited to a plurality of User Equipment (UE) 112, network elements associated with one or more Radio Access Networks RAN 114, network elements associated with one or more network cores 116, hardware and software elements associated with one or more mobile switching centers (MSC) 118, and hardware and software elements associated with a Public Switched Telephone Network (PSTN) 120. A UE 112 can be one of various forms of wireless devices that are capable of communication according to the radio access technology (RAT) of the cellular network 110. For instance, UE 112 can be a smartphone, wireless modem, cellular phone, laptop computer, wireless access point (APs), etc.

The RAN 114 generally is responsible to implement the Radio Access Technology (RAT) associated with the cellular network 110 and connects the UEs 112 with the network core 116. Depending on the RAT implemented by the RAN 114, the RAN 114 may include several hardware and software network elements. Generally, RAN 114 includes a plurality of macro cells and small cells. For example, when the RAT includes 5G NR, the RAN 114 may include several Radio Units (RU), Distributed units (DU), and Control Units (CU). RU generally refers to a radio hardware entity (e.g., cell tower antennas and associated radio hardware) that converts radio signals sent to and from the antenna into digital signals for transmission over a packet network. The RU handles the digital front end (DFE) and the lower physical (PHY) layer. The DU is generally a software entity that is deployed at a cell site on a server and provides support for the lower layers of the protocol stack such as the radio link control (RLC), medium access control (MAC), and parts of the PHY layer. The CU may also be a software entity deployed on a server and provides support for the higher layers of the protocol stack such as the service data adaptation protocol (SDAP), packet data convergence protocol (PDCP) and radio resource control (RRC). The CU connects to a 5G core (e.g., network core 116) which provides UEs 112 access to the data network 190. The 5G RAN typically includes a network of gNBs (e.g., macro cells, small cells etc.), wherein each gNB provides connectivity between a UE 112 and the 5G core which is an example of network core 116. Each gNB may include one CU, but one CU may control multiple DUs. Further, each DU may support a plurality of cell sites. In one embodiment, a cell site may include 6 RUs controlled by one DU.

The network core 116 is the heart of the cellular network 110 and is responsible to control data and control plane operations. For example, the architecture of the 5G core relies on a "Service-Based Architecture" (SBA) framework, where the architectural elements are defined in terms of "Network Functions" (NFs) rather than by traditional network entities. Via interfaces of a common framework, any given NF provides its services to all the other authorized NFs and/or to any consumers that are permitted to make use of these provided services. Such an SBA approach provides modularity and reusability. For example, network functions that may make up the 5G core include Network Slice Selection Function (NSSF) 202, Network Exposure Function (NEF) 204, Network Repository Function (NRF) 206, Policy Control Function (PCF) 208, Unified Data Management (UDM) 210, Application Function (AF) 212, Network Slice Specific Authentication and Authorization Function (NSSAF) 214, Authentication Server Function (AUSF) 216, Access and Mobility Management Function (AMF) 218, Session Management Function (SMF) 220, Service Communication Proxy (SCP) 222 and User Plane Function (UPF) 224. These network functions are likely to be used in most of the 5G networks but depending on real deployment there may be more components or in some cases (e.g., small scale private networks) there may be less components where multiple functionalities are aggregated into one component. Each network function may be implemented by one or more computer processors (e.g., one or more computing servers).

In the context of the present disclosure, network elements associated with the cellular network 110 also includes hardware connections and software interfaces between hardware and software network elements described above.

It may be noted that while cellular network 110 may be described in the context of a 5G NR radio network that uses gNodeBs as base stations, the embodiments detailed herein can be applicable to other types of cellular networks, such as a 4G Long Term Evolution (LTE) cellular network, that uses eNodeBs in place of gNodeBs. In one or more embodiments, cellular network 110 operates according to the 5G NR radio access technology (RAT). In other embodiments, a different RAT may be used, such as 3G, 4G Long Term Evolution (LTE), or some other RAT. In some other embodiments, as shown in FIG. 1, the 5G network may use a 5G core as the network core 116. In some embodiments, a 5G network may use an evolved packet core (EPC) as the network core 116 instead of or in addition to the 5G core.

The data network 190, in general, may be a wide area network (WAN), a personal area network (PAN), a cellular network, or any other technology that allows devices to communicate electronically with other devices. In one or more embodiments, the data network 190 may be the Internet.

In one or more embodiments, one or more of the user devices 140 may be part of a network operator's Information Technology (IT) infrastructure, wherein the network operator operates at least a portion of the cellular network 110. The user devices 140 may be operated by users 142 (e.g., users 142a and 142b). In one embodiment, the users 142 (including users 142a and 142b) are part of support teams (e.g., handset team, RAN team, Core team etc.) deployed by a network operator associated with the cellular network 110. In an alternative or additional embodiment, one or more users 142 and corresponding user devices 140 may belong to a partner (e.g., handset manufacturer) of the network operator associated with the cellular network 110.

Often errors/faults occur when two devices (e.g., UEs 112) are communicating or attempting to communicate with each other in the cellular network 110. The errors/faults may include, but are not limited to, a call failure, undelivered text message, and failed data transmission between two UEs 112. Usually, when an error/fault relating to a communication between two UEs 112 is detected by and/or reported (e.g., by a user) to a network operator associated with the cellular network 110, one or more designated teams at the network operator's end are assigned to investigate the error, identify a root cause of the error, and resolve the error. For example, a user may report a call failure associated with calling a particular cell phone number using a particular model of smartphone. Upon receiving the report, the network operator may perform several checks to identify a root cause of the error. Generally, several support teams are involved in the investigation and resolution of an error. For example, a handset team may check for errors in the particular model of the smart phone used for the placing the call or receiving the call, a RAN team may check for errors associated with network elements relating to the RAN 114, and a core team may check for errors associated with network elements relating to the network core 116. Usually, a pre-selected investigation workflow is followed that uses a process of elimination to identify the root cause of the reported error. This means that the various teams are assigned to investigate the error one by one based on a pre-selected order of the investigation workflow. For example, the handset team first checks for errors in the particular model of the smart phone used for the placing the call. If no error is found in the smartphone, the RAN team takes over and checks for errors associated with network elements relating to the RAN 114. If no RAN errors are found, then the core team takes over and checks for errors associated with network elements relating to the network core 116.

Generally, a first step in investigating an error associated with a communication between two UEs 112 in the cellular network 110 is running a network trace 172 (shown as 172a, 172b, . . . 172n) of the communication which includes tracing a route taken by data/signaling between the UEs 112 through various network elements of the cellular network 110 and recording a plurality of key quality indicators (KQIs) and key performance indicators (KPIs) associated with the monitored network elements. The KQIs and KPIs indicate performance of the network elements and may indicate problems and/or failures of particular network elements. For example, certain pre-configured anomalies in the KQI and/or KPI data associated with one or more network elements may indicate malfunction/failure of the network elements. Various support teams such as the RAN team and the Core team may use the results of a network trace 172 to isolate a root cause of an error.

Network tracing services are provided by third party providers. Often a network operator subscribes to the network tracing services provided by a third part provider to run network traces. For example, Radcom Ltd. provides software tools that may be subscribed to and used to run network traces on a cellular network 110. For example, network tracing sub-system 160 may be operated by one such third party provider and can be used by subscribes (e.g., users 142 associated with a network operator) to run network traces 172.

The network tracing sub-system 160 includes a processor 162, a memory 166, and a network interface 164. The network tracing sub-system 160 may be configured as shown in FIG. 1 or in any other suitable configuration.

The processor 162 includes one or more processors operably coupled to the memory 166. The processor 162 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 162 may be a programmable logic device, a microcontroller, a microprocessor, or any suitable combination of the preceding. The processor 162 is communicatively coupled to and in signal communication with the memory 166. The one or more processors are configured to process data and may be implemented in hardware or software. For example, the processor 162 may be 8-bit, 16-bit, 32-bit, 64-bit or of any other suitable architecture. The processor 162 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions (e.g., instructions 174) to implement the network tracing sub-system 160. In this way, processor 162 may be a special-purpose computer designed to implement the functions disclosed herein. In one or more embodiments, the network tracing sub-system 160 is implemented using logic units, FPGAs, ASICs, DSPs, or any other suitable hardware. The network tracing sub-system 160 is configured to operate as described with reference to FIGS. 1 and 2. For example, the processor 162 may be configured to perform at least a portion of the method 200 as described in FIG. 2.

The memory 166 comprises a non-transitory computer-readable medium such as one or more disks, tape drives, or solid-state drives, and may be used as an over-flow data storage device, to store programs when such programs are selected for execution, and to store instructions and data that are read during program execution. The memory 166 may be volatile or non-volatile and may comprise a read-only memory (ROM), random-access memory (RAM), ternary content-addressable memory (TCAM), dynamic random-access memory (DRAM), and static random-access memory (SRAM).

The memory 166 is operable to store API 168, records 170 and instructions 174. The instructions 174 may include any suitable set of instructions, logic, rules, or code operable to execute the network tracing sub-system 160.

The network interface 164 is configured to enable wired and/or wireless communications. The network interface 164 is configured to communicate data between the network tracing sub-system 160 and other devices, systems, or domains (e.g., user devices 140, ticketing sub-system 130 etc.). For example, the network interface 164 may comprise a Wi-Fi interface, a LAN interface, a WAN interface, a modem, a switch, or a router. The processor 162 is configured to send and receive data using the network interface 164. The network interface 164 may be configured to use any suitable type of communication protocol as would be appreciated by one of ordinary skill in the art.

Users 142 (e.g., users associated with a network operator) may subscribe to network tracing services provided by the network tracing sub-system 160. This may include generating login credentials that may allow the user 142 to login to the network tracing sub-system 160 and run network traces 172. In one embodiment, the network tracing sub-system 160 may provide network tracing services as a web service. In an additional or alternative embodiment, the network tracing sub-system 160 may provide network tracing services as a cloud service. For example, a user 142b (e.g., a user 142 associated with a network operator) may use a user device 140b to remotely login to the network tracing sub-system 160 using login credentials of the user 142b and run network traces 172 in the cellular network 110. Results of network traces 172 performed using the network tracing sub-system 160 are stored as records 170 in the memory 166 of the network tracing sub-system 160. As shown in FIG. 1, the memory 166 stores a plurality of historical records 170 (shown as record 170a, record 170b, . . . record 170n) of respective network traces 172 (shown as network trace 172a, network trace 172b, . . . network trace 172n) performed in the network tracing sub-system 160. Each record 170 of a network trace 172 may include quality and performance parameters such as KQI and/or KPIs associated with a plurality of network elements associated with the network trace 172. In one embodiment, the users 142 (including users 142a and 142b) are part of support teams (e.g., handset team, RAN team, Core team etc.) deployed by a network operator associated with the cellular network 110. Further, one or more of the user devices 140 may be part of the network operator's Information Technology (IT) infrastructure.

A network operator may use a ticketing tool to track and manage the investigative process associated with investigating and resolving an error associated with the cellular network 110. One example of such a ticketing tool is the Jira software tool developed by Atlassian Corporation that allows bug tracking and agile project management. Ticketing sub-system 130 shown in FIG. 1 is an example of an improved ticketing sub-system that may be used to track investigation and resolution of errors associated with the cellular network 110. In one embodiment, the ticketing sub-system may be owned and/or operated by a network operator associated with the cellular network.

The ticketing sub-system 130 includes a processor 132, a memory 136, and a network interface 134. The ticketing sub-system 130 may be configured as shown in FIG. 1 or in any other suitable configuration.

The processor 132 includes one or more processors operably coupled to the memory 136. The processor 132 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 132 may be a programmable logic device, a microcontroller, a microprocessor, or any suitable combination of the preceding. The processor 132 is communicatively coupled to and in signal communication with the memory 136. The one or more processors are configured to process data and may be implemented in hardware or software. For example, the processor 132 may be 8-bit, 16-bit, 32-bit, 64-bit or of any other suitable architecture. The processor 132 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions (e.g., instructions 139) to implement the ticketing sub-system 130. In this way, processor 132 may be a special-purpose computer designed to implement the functions disclosed herein. In one or more embodiments, the ticketing sub-system 130 is implemented using logic units, FPGAs, ASICs, DSPs, or any other suitable hardware. The ticketing sub-system 130 is configured to operate as described with reference to FIGS. 1 and 2. For example, the processor 132 may be configured to perform at least a portion of the method 200 as described in FIG. 2.

The memory 136 comprises a non-transitory computer-readable medium such as one or more disks, tape drives, or solid-state drives, and may be used as an over-flow data storage device, to store programs when such programs are selected for execution, and to store instructions and data that are read during program execution. The memory 136 may be volatile or non-volatile and may comprise a read-only memory (ROM), random-access memory (RAM), ternary content-addressable memory (TCAM), dynamic random-access memory (DRAM), and static random-access memory (SRAM).

The memory 136 is operable to store incident tickets 138, associated records 170 and instructions 139. The instructions 139 may include any suitable set of instructions, logic, rules, or code operable to execute the ticketing sub-system 130.

The network interface 134 is configured to enable wired and/or wireless communications. The network interface 134 is configured to communicate data between the ticketing sub-system 130 and other devices, systems, or domains (e.g., user devices 140, network tracing sub-system 160 etc.). For example, the network interface 134 may comprise a Wi-Fi interface, a LAN interface, a WAN interface, a modem, a switch, or a router. The processor 132 is configured to send and receive data using the network interface 134. The network interface 134 may be configured to use any suitable type of communication protocol as would be appreciated by one of ordinary skill in the art.

It may be noted that each user device 140, may be implemented similar to the ticketing sub-system 130. For example, a user device 140 may include a processor and a memory storing instructions to implement the respective functionality of the user device 140 when executed by the processor.

Support team members (e.g., user 142a) of a network operator may use the ticketing sub-system 130 to generate incident tickets 138 relating to errors (e.g., detected or reported errors) associated with the cellular network 110. As shown in FIG. 1, memory 136 stores a plurality of incident tickets 138 (shown as IT 138a, IT 138b, . . . . IT 138n), wherein each incident ticket 138 relates to a different error incident associated with the cellular network 110. A particular incident ticket 138 includes information relating to a particular error incident associated with the cellular network 110. For example, a user 142a may use a user device 140a to generate an incident ticket 138a relating to a call failure between two UEs 112. Once generated, the incident ticket 138a may then be used to track the entire lifecycle associated with investigation and resolution of this error incident. For example, the incident ticket 138a may store all information related to investigation and resolution of the call failure including a log of all investigative steps performed to identify a root cause of the error and corrective measures taken to resolve the error. An incident ticket 138 may be accessible to several users 142 associated with investigating and resolving a particular error incident associated with the incident ticket 138. For example, the incident ticket 138a may be accessible to members from the handset team, the RAN team and the core team, wherein each of the team members may view the information associated with the incident ticket 138a and add additional information. In certain embodiments, an incident ticket 138 may be assigned to an external partner such as a handset manufacturer, which means that a user 142 associated with the external partner may access the ticketing sub-system 130, view information stored in the incident ticket 138 and add additional information (e.g., findings based on investigating the error).

In certain embodiments, the network tracing sub-system 160 may be configured to store a particular record 170 of a network trace 172 for a pre-configured time period from the time the network trace 172 is performed or the record 170 is generated. The network tracing sub-system 160 may be configured to delete the particular record 170 after the pre-configured time period has expired. This means that the record 170 of the network trace 172 is available to the investigative teams (e.g., RAN team, Core team etc.) only for the pre-configured time period and all investigation of the error incident needs to be completed before the record 170 is deleted from the network tracing sub-system 160. However, several delays may be associated with an investigation workflow followed to investigate the error incident and the investigation may not be completed before the record 170 is deleted from the network tracing sub-system 160. This means that the network trace 172 may need to be re-run. This may not always be practical as additional costs and resources are needed to re-run the network trace 172. Additionally, it may be difficult to set the same testing conditions such as same parameters for testing to re-create the same exact scenario/conditions as the original network trace 172.

In one example use case, in response to receiving an error report (e.g., by a network operator) of a call failure of a call placed from a first UE to a second UE (e.g., two different UEs 112), a handset team is first assigned to investigate the call failure between the two UEs 112. A member (e.g., user 142b) of the handset team at the network operator's end logs into the network tracing subsystem 160 using login credentials of the user 142b and runs a network trace 172a of the call which includes tracing a network route taken by the call through various network elements of the cellular network 110. For example, using the network tracing sub-system, the user 142 initiates a test call from the first UE (or another similar UE of similar specifications—e.g., another smartphone of the same model) to the second UE (or another UE similar to the second UE) and monitors the route taken by the call through various network elements of the cellular network 110. The results of the network trace 172a are stored as record 170a of the network trace 172a in memory 166. The record 170a of the network trace 172a may include quality and performance parameters such as KQI and/or KPIs associated with a plurality of network elements traversed by the call.

Once the network trace 172a has been performed and the record 170a of the network trace 172a has been stored in memory 166 associated with the network tracing sub-system 160, a member (e.g., user 142b or another user 142a) of the handset team may generate an incident ticket 138a in the ticketing sub-system to track the investigation and resolution of the error incident relating to the call failure between the two UEs 112. For example, user 142a may use a user device 140a to transmit a request 143 to the ticketing sub-system 130 for generating the incident ticket 138a. In response to receiving the request 143, the ticketing sub-system 130 may generate a new incident ticket 138a. The user 142a may include in the incident ticket 138a information relating to the error incident including, but not limited to, a model of smartphone used to place the call, a model of smart phone that received the call, a phone number of the calling phone, a phone number of the called phone, a network operator associated with the calling phone, and a network operator associated with the called phone. The handset team may then assign the incident ticket 138a to the handset manufacturer of the phone that placed the call. Assigning the incident ticket 138a may include providing one or more personnel of the handset manufacturer access to the incident ticket 138a and associated information in the ticketing sub-system 130. In one embodiment, the ticketing sub-system 130 may receive a command from a user 142a to assign the incident ticket 138a to the handset manufacturer. In response, the ticketing sub-system 130 may transmit an indication of the incident ticket to the handset manufacturer (e.g., a personnel of the handset manufacturer). The handset manufacturer may take some time to check for any errors associated with the particular model of smartphone that may have caused the error incident. If no error is found in the smartphone, the handset manufacturer may enter the findings as part of the incident ticket 138a. The handset team at the network operator's end may then assign the incident ticket 138a to a RAN team. To check for RAN errors that may have caused the call failure, the RAN team may need to review the record 170 of the network trace 172a stored in the network tracing sub-system 160. However, by the time the RAN team is assigned the incident ticket 138a, the record 170a of the network trace 172a may have been deleted from the network tracing sub-system 160. As noted above, the network tracing sub-system may store records 170 of network traces 172 only for a pre-configured time period after which the records 170 are deleted. This means that the RAN team may need to re-run the network trace 172a which, as described above, may not be practical.

Embodiments of the present disclosure describe techniques for intelligently capturing records 170 of network traces 172a performed using a network tracing sub-system 160 such that the records 170 are available indefinitely allowing investigation of a respective error incident to be performed without any time constraint.

Following the example use case described above, a user 142 (e.g., user 142a) may provide to the ticketing sub-system 130 one or more search parameters 144 associated with the network trace 172a associated with the failed call between the two UEs 112 for which the incident ticket 138a was generated. The one or more search parameters 144 may include unique parameters or a combination of parameters that uniquely identify the record 170a of the network trace 172a stored in the network tracing sub-system 160. For example, the search parameters 144 may include a phone number of the calling phone, a phone number of the called phone, a date on which the network trace 172a was performed, a time at which the network trace 172a was performed, and a unique record locator associated with the record 170a. In one embodiment, the ticketing sub-system 130 may provide a user interface that allows the user 142 to provide the one or more search parameters 144. For example, the user 142a may access and open the incident ticket 138a in the ticketing sub-system 130. Once the incident ticket 138a is open, an interface screen associated with the incident ticket 138a may provide one or more fields in which the user 142a may enter search parameters 144 associated with the record 170a of the network trace 172a. In one embodiment, a combination of two or more search parameters 144 provided by the user 142 may uniquely identify the record 170 in the network tracing sub-system 160.

Ticketing sub-system 130 may be configured to generate Application Programming Interface (API) calls 152 for the network tracing sub-system 160. In this context, network tracing sub-system 160 provides an API that may be used as an interface for communication between the network tracing sub-system 160 and the ticketing sub-system 130. Following the above example use case, in response to receiving one or more search parameters 144, the ticketing sub-system 130 may be configured to generate an API call 152 that includes a request for the record 170a of the network trace 172a and the one or more search parameters 144 provided by the user 142a. In one embodiment, after entering the one or more search parameters in respective fields provided by an interface of the ticketing sub-system 130 the user 142a may click a button to request importing the record 170a of the network trace 172a and associating the record 170a with the incident ticket 138a. This causes the ticketing sub-system 130 to generate the API call 152 and transmit the API call 152 to the network tracing sub-system 160. In one embodiment, the ticketing sub-system 130 transmits the API call 152 to a network address (e.g., uniform resource identifier (URI)) associated with the API 168 of the network tracing sub-system 160.

Upon receiving the API call 152 (e.g., via API 168) from the ticketing sub-system 130, the network tracing sub-system may be configured to search the memory 166 for a record 170 based on the one or more search parameters 144 included in the API call 152. For example, based on searching the memory 166, the network tracing sub-system 160 may retrieve the record 170a of the network trace 172a uniquely identified by the one or more search parameters 144. The network tracing sub-system 160 may transmit a response message 154 back to the ticketing sub-system 130 including a copy of the record 170a, of the network trace 172a. Upon receiving the response message 154, the ticketing sub-system 130 may store the record 170a of the network trace 172a in memory 136 and associate the record 170a with the incident ticket 138. For example, ticketing sub-system 130 may store the record 170a of the network trace 172a as part of the information associated with the incident ticket 138a. As shown in FIG. 1, ticketing sub-system 130 stores several records 170 of network traces 172 associated with respective incident tickets 138. For example, in addition to record 170 of the network trace 172a associated with incident ticket 138a, ticketing sub-system 130 stores record 170b of network trace 172b associated with incident ticket 138b, and stores record 170n of network trace 172n associated with incident ticket 138n. Each record 170 may be retrieved from the network tracing sub-system 160 using the process described above with reference to record 170a of network trace 172a.

Once a record 170 of a network trace 172 is saved in the ticketing sub-system 130 and associated with the respective incident ticket 138, the record 170 is available and accessible indefinitely for review without any time constraint. For example, any user 142 that has access to a particular incident ticket 138 may review the record 170 associated with the particular incident ticket 138. In an additional or alternative embodiment, a user 142 may access a particular record 170 of a network trace 172 from the memory 136 by providing one or more search parameters (e.g., search parameters 144) that uniquely identify the record 170. For example, the user 142a may use the user device 140a to place a request 145 for reviewing the record 170a of the network trace 172a. The request 145 may include one or more search parameters (e.g., search parameters 144) that uniquely identify the record 170a. In response to receiving the request 145, the ticketing sub-system 130 may search the memory 136 based on the search parameters included in the request 145 and present the record 170a on a display of the user device 140a.

FIG. 2 is a flowchart of an example method 200 for capturing a network trace 172 performed in a cellular network 110, in accordance with embodiments of the present disclosure. At least a portion of the method 200 may be performed by the ticketing sub-system 130 as shown in FIG. 1 and described above.

At operation 202, the ticketing sub-system 130 receives a first request (e.g., request 143) to generate an incident ticket 138 relating to an error associated with a communication between two devices (e.g., UEs 112) in the cellular communication network (e.g., cellular network 110).

At operation 204, in response to receiving the first request (e.g., request 143), the ticketing sub-system 130 generates the incident ticket 138.

As described above, support team members (e.g., user 142a) of a network operator may use the ticketing sub-system 130 to generate incident tickets 138 relating to errors (e.g., detected or reported errors) associated with the cellular network 110. As shown in FIG. 1, memory 136 stores a plurality of incident tickets 138 (shown as IT 138a, IT 138b, . . . . IT 138n), wherein each incident ticket 138 relates to a different error incident associated with the cellular network 110. A particular incident ticket 138 includes information relating to a particular error incident associated with the cellular network 110. For example, a user 142a may use a user device 140a to generate an incident ticket 138a relating to a call failure between two UEs 112. For example, user 142a may use a user device 140a to transmit a request 143 to the ticketing sub-system 130 for generating the incident ticket 138a. In response to receiving the request 143, the ticketing sub-system 130 may generate a new incident ticket 138a. Once generated, the incident ticket 138a may then be used to track the entire lifecycle associated with investigation and resolution of this error incident. For example, the incident ticket 138a may store all information related to investigation and resolution of the call failure including a log of all investigative steps performed to identify a root cause of the error and corrective measures taken to resolve the error. For example, the user 142a may include in the incident ticket 138a information relating to the error incident including, but not limited to, a model of smartphone used to place the call, a model of smart phone that received the call, a phone number of the calling phone, a phone number of the called phone, a network operator associated with the calling phone, and a network operator associated with the called phone.

At operation 206, the ticketing sub-system 130 receives one or more search parameters 144 relating to a network trace 172a associated with the communication between the two devices (e.g., two UEs 112) performed in the cellular network 110 using a network tracing sub-system 160, wherein the network trace 172a records in the network tracing sub-system 160 data relating to integrity of network elements of the cellular network 110 that are used to perform the communication between the two devices.

Following the example use case described above, a user 142 (e.g., user 142a) may provide to the ticketing sub-system 130 one or more search parameters 144 associated with the network trace 172a associated with the failed call between the two UEs 112 for which the incident ticket 138a was generated. The one or more search parameters 144 may include unique parameters or a combination of parameters that uniquely identify the record 170a of the network trace 172a stored in the network tracing sub-system 160. For example, the search parameters 144 may include a phone number of the calling phone, a phone number of the called phone, a date on which the network trace 172a was performed, a time at which the network trace 172a was performed, and a unique record locator associated with the record 170a. In one embodiment, the ticketing sub-system 130 may provide a user interface that allows the user 142 to provide the one or more search parameters 144. For example, the user 142a may access and open the incident ticket 138a in the ticketing sub-system 130. Once the incident ticket 138a is open, an interface screen associated with the incident ticket 138a may provide one or more fields in which the user 142a may enter search parameters 144 associated with the record 170a of the network trace 172a. In one embodiment, a combination of two or more search parameters 144 provided by the user 142 may uniquely identify the record 170 in the network tracing sub-system 160.

At operation 208, the ticketing sub-system 130 generates an API call 152 for the network tracing sub-system 160, wherein the API call 152 at least comprises a second request for a record 170a of the network trace 172a associated with the communication between the two devices and the one or more search parameters 144 associated with the network trace 172a, wherein the one or more search parameters 144 are to be used at the network tracing sub-system 160 to retrieve the record 170a of the network trace 172a.

At operation 210, the ticketing sub-system 130 transmits the API call 152 to the network tracing sub-system 160.

As described above, ticketing sub-system 130 may be configured to generate Application Programming Interface (API) calls 152 for the network tracing sub-system 160. In this context, network tracing sub-system 160 provides an API that may be used as an interface for communication between the network tracing sub-system 160 and the ticketing sub-system 130. Following the above example use case, in response to receiving one or more search parameters 144, the ticketing sub-system 130 may be configured to generate an API call 152 that includes a request for the record 170*a* of the network trace 172*a* and the one or more search parameters 144 provided by the user 142*a*. In one embodiment, after entering the one or more search parameters in respective fields provided by an interface of the ticketing sub-system 130 the user 142*a* may click a button to request importing the record 170*a* of the network trace 172*a* and associating the record 170*a* with the incident ticket 138*a*. This causes the ticketing sub-system 130 to generate the API call 152 and transmit the API call 152 to the network tracing sub-system 160. In one embodiment, the ticketing sub-system 130 transmits the API call 152 to a network address (e.g., uniform resource identifier (URI)) associated with the API 168 of the network tracing sub-system 160.

Upon receiving the API call 152 (e.g., via API 168) from the ticketing sub-system 130, the network tracing sub-system may be configured to search the memory 166 for a record 170 based on the one or more search parameters 144 included in the API call 152. For example, based on searching the memory 166, the network tracing sub-system 160 may retrieve the record 170*a* of the network trace 172*a* uniquely identified by the one or more search parameters 144.

At operation 212, the ticketing sub-system 130 receives the record 170*a* of the network trace 172*a* from the network tracing sub-system 160. As described above, the network tracing sub-system 160 may transmit a response message 154 back to the ticketing sub-system 130 including a copy of the record 170*a*, of the network trace 172*a*.

At operation 214, the ticketing sub-system 130 stores the received record of the network trace in the memory.

As described above, upon receiving the response message 154, the ticketing sub-system 130 may store the record 170*a* of the network trace 172*a* in memory 136 and associate the record 170*a* with the incident ticket 138. For example, ticketing sub-system 130 may store the record 170*a* of the network trace 172*a* as part of the information associated with the incident ticket 138*a*. As shown in FIG. 1, ticketing sub-system 130 stores several records 170 of network traces 172 associated with respective incident tickets 138. For example, in addition to record 170 of the network trace 172*a* associated with incident ticket 138*a*, ticketing sub-system 130 stores record 170*b* of network trace 172*b* associated with incident ticket 138*b*, and stores record 170*n* of network trace 172*n* associated with incident ticket 138*n*. Each record 170 may be retrieved from the network tracing sub-system 160 using the process described above with reference to record 170*a* of network trace 172*a*.

At operation 216, the ticketing sub-system 130 receives a third request to view the record of the network trace.

At operation 218, in response to receiving the third request, the ticketing sub-system 130 retrieves the record of the network trace from the memory.

At operation 220, the ticketing sub-system 130 presents, on a display device, the record of the network trace.

As described above, once a record 170 of a network trace 172 is saved in the ticketing sub-system 130 and associated with the respective incident ticket 138, the record 170 is available and accessible indefinitely for review without any time constraint. For example, any user 142 that has access to a particular incident ticket 138 may review the record 170 associated with the particular incident ticket 138. In an additional or alternative embodiment, a user 142 may access a particular record 170 of a network trace 172 from the memory 136 by providing one or more search parameters (e.g., search parameters 144) that uniquely identify the record 170. For example, the user 142*a* may use the user device 140*a* to place a request 145 for reviewing the record 170*a* of the network trace 172*a*. The request 145 may include one or more search parameters (e.g., search parameters 144) that uniquely identify the record 170*a*. In response to receiving the request 145, the ticketing sub-system 130 may search the memory 136 based on the search parameters included in the request 145 and present the record 170*a* on a display of the user device 140*a*.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory configured to store incident tickets relating to errors in a cellular communication network; and
   a processor communicatively coupled to the memory and configured to:
      receive a first request to generate an incident ticket relating to an error associated with a communication between two devices in the cellular communication network;
      in response to receiving the first request generate the incident ticket;
      receive one or more search parameters relating to a network trace associated with the communication between the two devices performed in the cellular communication network using a network tracing sub-system, wherein the network trace records, in the network tracing sub-system, data relating to integrity of network elements of the cellular communication network that are used to perform the communication between the two devices;
      generate an Application Programming Interface (API) call for the network tracing sub-system, wherein the API call at least comprises:
         a second request for a record of the network trace associated with the communication between the two devices; and
         the one or more search parameters associated with the network trace, wherein the one or more search parameters are to be used at the network tracing sub-system to retrieve the record of the network trace;

transmit the API call to the network tracing sub-system;

receive the record of the network trace from the network tracing sub-system;

store the received record of the network trace in the memory;

receive a third request to view the record of the network trace;

in response to receiving the third request, retrieve the record of the network trace from the memory; and present, on a display device, the record of the network trace.

2. The system of claim 1, wherein the record of the network trace is configured to be stored at the network tracing sub-system for a pre-configured time period, wherein the record is deleted from the network tracing sub-system after the pre-configured time period has expired.

3. The system of claim 1, wherein the communication between the two devices comprises one or more of a phone call, a text message or a data transmission.

4. The system of claim 3, wherein the error associated with the communication between the two devices comprises a failure associated with one or more of the phone call, the text message or a data transmission.

5. The system of claim 1, wherein the one or more search parameters associated with the network trace comprises one or more of a date on which the network trace was performed, a time at which the network trace was performed, a first phone number associated with one of the two devices, or a second phone number associated a remaining one of the two devices.

6. The system of claim 1, wherein the two devices associated with the network trace comprise two different User Equipment (UEs).

7. The system of claim 1, wherein the processor is further configured to:

receive a command to assign the incident ticket to a particular entity responsible to investigate the error; and in response to receiving the command, transmit an indication of the incident ticket to the particular entity.

8. The system of claim 1, wherein:

the third request comprises the one or more search parameters associated with the network trace; and the processor is further configured to:

search the memory for the record based on the one or more search parameters; and identify, from the memory based on the search, the record of the network trace.

9. A method for capturing network traces performed in a cellular communication network comprising:

receive a first request to generate an incident ticket relating to an error associated with a communication between two devices in the cellular communication network;

in response to receiving the first request generate the incident ticket;

receive one or more search parameters relating to a network trace associated with the communication between the two devices performed in the cellular communication network using a network tracing sub-system, wherein the network trace records, in the network tracing sub-system, data relating to integrity of network elements of the cellular communication network that are used to perform the communication between the two devices;

generate an Application Programming Interface (API) call for the network tracing sub-system, wherein the API call at least comprises:

a second request for a record of the network trace associated with the communication between the two devices; and the one or more search parameters associated with the network trace, wherein the one or more search parameters are to be used at the network tracing sub-system to retrieve the record of the network trace;

transmit the API call to the network tracing sub-system;

receive the record of the network trace from the network tracing sub-system;

store the received record of the network trace in a memory;

receive a third request to view the record of the network trace;

in response to receiving the third request, retrieve the record of the network trace from the memory; and present, on a display device, the record of the network trace.

10. The method of claim 9, wherein the record of the network trace is configured to be stored at the network tracing sub-system for a pre-configured time period, wherein the record is deleted from the network tracing sub-system after the pre-configured time period has expired.

11. The method of claim 9, wherein the communication between the two devices comprises one or more of a phone call, a text message or a data transmission.

12. The method of claim 11, wherein the error associated with the communication between the two devices comprises a failure associated with one or more of the phone call, the text message or a data transmission.

13. The method of claim 9, wherein the one or more search parameters associated with the network trace comprises one or more of a date on which the network trace was performed, a time at which the network trace was performed, a first phone number associated with one of the two devices, or a second phone number associated a remaining one of the two devices.

14. The method of claim 9, wherein the two devices associated with the network trace comprise two different User Equipment (UEs).

15. A non-transitory computer-readable medium storing instructions that when executed by a processor cause the processor to:

receive a first request to generate an incident ticket relating to an error associated with a communication between two devices in a cellular communication network;

in response to receiving the first request generate the incident ticket;

receive one or more search parameters relating to a network trace associated with the communication between the two devices performed in the cellular communication network using a network tracing sub-system, wherein the network trace records, in the network tracing sub-system, data relating to integrity of network elements of the cellular communication network that are used to perform the communication between the two devices;

generate an Application Programming Interface (API) call for the network tracing sub-system, wherein the API call at least comprises:

a second request for a record of the network trace associated with the communication between the two devices; and the one or more search parameters associated with the network trace, wherein the one or more search parameters are to be used at the network tracing sub-system to retrieve the record of the network trace;

transmit the API call to the network tracing sub-system;

receive the record of the network trace from the network tracing sub-system;

store the received record of the network trace in a memory;

receive a third request to view the record of the network trace;

in response to receiving the third request, retrieve the record of the network trace from the memory; and present, on a display device, the record of the network trace.

16. The non-transitory computer-readable medium of claim 15, wherein the record of the network trace is configured to be stored at the network tracing sub-system for a pre-configured time period, wherein the record is deleted from the network tracing sub-system after the pre-configured time period has expired.

17. The non-transitory computer-readable medium of claim 15, wherein the communication between the two devices comprises one or more of a phone call, a text message or a data transmission.

18. The non-transitory computer-readable medium of claim 17, wherein the error associated with the communication between the two devices comprises a failure associated with one or more of the phone call, the text message or a data transmission.

19. The non-transitory computer-readable medium of claim 15, wherein the one or more search parameters associated with the network trace comprises one or more of a date on which the network trace was performed, a time at which the network trace was performed, a first phone number associated with one of the two devices, or a second phone number associated a remaining one of the two devices.

20. The non-transitory computer-readable medium of claim 15, wherein the two devices associated with the network trace comprise two different User Equipment (UEs).

* * * * *